3,190,349
ROTARY REGENERATIVE HEAT EXCHANGERS
Waldemar Hryniszak, Newcastle upon Tyne, England, assignor to C. A. Parsons & Company Limited, Newcastle upon Tyne, England, a British company
Filed Aug. 12, 1963, Ser. No. 301,458
Claims priority, application Great Britain, Aug. 13, 1962, 30,974/62
2 Claims. (Cl. 165—7)

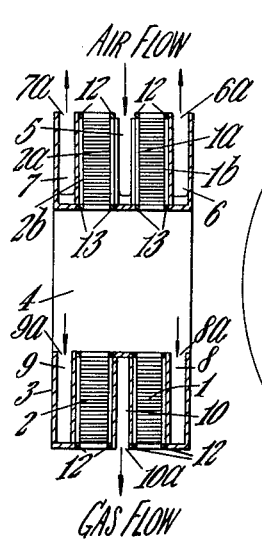

This invention relates to rotary regenerative heat exchangers of the disc-type suitable for use especially but not exclusively with gas turbine plants, that is to say the type in which a disc of heat storing material is caused to rotate through a compartment carrying hot fluid and thence through a compartment carrying cold fluid; fluid in each compartment flows through the heat storing material in a direction which is substantially parallel to the axis of rotation of the disc; seals acting on each end face of the disc and along its peripheral edges prevent or reduce the flow of fluid between the compartment or compartments carrying the hot fluid and the compartment or compartments carrying cold fluid; the heat storing material is heated by the hot fluid in one compartment and gives up the heat to cold fluid in a subsequent compartment in the direction of rotation.

The invention consists in a rotary regenerative heat exchanger comprising at least one pair of discs of heat storing material mounted side by side in spaced relation with end faces of adjacent discs facing one another, one heat exchanging fluid being admitted to the space between the discs and flowing in opposite directions through the discs to an outer end face of each disc, whilst the other fluid flows to each outer end face of the discs and through the discs to enter the space between discs.

Referring to the accompanying drawings,
FIGURE 1 shows a section through a disc type rotary regenerative heat exchanger in accordance with one embodiment of the invention,
FIGURE 2 is an end view of one of the discs of FIGURE 1,
FIGURE 3 is a section through a rotary regenerative heat exchanger in accordance with an alternative embodiment of the invention,
FIGURE 4 is an end view of one of the discs of FIGURE 3.

In carrying the invention into effect in the forms illustrated by way of example, and referring first to FIGURES 1 and 2, a rotary regenerative heat exchanger of the disc type comprises a pair of discs, 1 and 2 both made of heat storing material. The discs are arranged side by side in spaced relation with their end faces 1a, 2a, facing one another.

The discs are mounted for rotation in a casing 3.
The discs 1 and 2 and the casing 3 are annular in shape leaving a central space 4.

In the application of such a heat exchanger for gas turbine plant, an application for which it is primarily though not exclusively intended, air from a compressor enters a space 5 between end faces 1a, 2a of the discs and then flows through the discs in opposite directions towards the outer end faces 1b, 2b of the discs. On leaving the discs it enters spaces 6, 7, flows radially outwards and leaves the heat exchanger casing via outlets 6a, 7a. Hot gas from a turbine exhaust enters space 4 and flows radially outward into spaces 8 and 9, from which spaces it flows through the discs towards spaces 10 which it eventually enters and then flows radially outward to an outlet 10a in the outer periphery of the casing 3.

Seals 11 are located on the end faces of the discs for preventing or reducing leakage across the end faces between hot gas and cold gas compartments of the heat exchanger. Further peripheral seals 12 prevent leakage along the outer peripheral edges of the discs between inlet and outlet end faces thereof. The seals 12 extend for the full circumference of the discs in accordance with known practice for such heat exchangers. Similar peripheral seals 13 are located at the inner peripheral edges of the discs.

In this arrangement allowance is made for difference in volume between the hot gas and cold gas and the area of the discs exposed to hot gas at any given time is approximately two thirds of the total area of the disc. The ratio of the areas exposed to the hot and cold gas can however be varied to suit circumstances.

Inlets 8a, 9a for gas from space 4 occupy a proportion of the inner periphery of the casing whilst the remainder is sealed to form a radially inner wall for spaces 6 and 7. The inlet to the space 5 extends over the outer periphery of the casing for a distance equivalent to the distance between the two face seals 11 and is divided by radial walls from the outlet for gas which has been cooled in the discs.

In the embodiment illustrated in FIGURES 3 and 4, the hot gas flow is again from space 4 but may be through a duct 14. This duct feeds hot gas into space 15 between the discs and it then flows in opposite directions in each disc towards the outer end faces 1b, 2b of the discs. It then enters spaces 16 and 17 and thence flows in a radially outward direction to outlets 16a, 17a in the outer periphery of the casing. The cold gas or air enters spaces 18 and 19 from peripheral inlets 18a, 19a flows through the discs in a direction towards space 20, enters space 20 and then flows radially outward to peripheral outlet 20a.

The circumferential extent of the inlets and outlets are related to the volume of gas to be heated or cooled as in the case of the heat exchanger illustrated in FIGURES 1 and 2.

The arrangement of FIGURES 3 and 4 is such that each end of the casing is cool relative to the inner part and this reduces any tendency for the casing to distort. In addition the space 4, especially if the hot gas is passed through a duct 14, can be kept relatively cool enabling the bearings, and if necessary the drive for the discs, to be positioned in the space 4.

Whilst the construction and operation of the heat exchanger has been described with particular reference to gas turbine plant the use is not limited thereto. It can be used for the same purposes as previously known rotary regenerative heat exchangers. The discs are preferably made of a glass-ceramic material having a negligible coefficient of thermal distortion of the discs.

Whilst two discs have been described more than two can be used, with the discs arranged in pairs along a common axis.

The arrangements described with reference to FIGURES 1–4 are particularly suitable for use with gas turbine plants, as mentioned above, as the space 4 can be adjacent the turbine exhaust or it can surround the exhaust with resulting simplification of gas ducting arrangements.

I claim:
1. A rotary regenerative heat exchanger comprising a stationary housing, a rotor containing heat storing material mounted for rotation within said housing, means dividing said housing into separate compartments for fluid to be heated and fluid to be cooled whereby as the rotor rotates it passes alternately through a compartment for fluid to be cooled and a compartment for fluid to be heated, said means including sealing means acting on end faces of the rotor and at the peripheral edges thereof, said rotor being annular in form to define an inner duct and comprising at least one pair of annular discs comprising said heat storing material and mounted side by side in spaced relation along the axis of rotation of the motor, means conveying fluid to be cooled to the said inner duct in the rotor and thence into a compartment of said housing to flow in an axial direction through each disc and thence pass to an outlet in said compartment adjacent the outer periphery of each disc, means conveying fluid to be heated to a compartment of the housing through an inlet adjacent the outer periphery of each disc to flow through each disc in an axial direction to an outlet from the compartment adjacent the outer periphery of each disc, and means to prevent flow of fluid to be heated into said inner duct.

2. A rotary regenerative heat exchanger as claimed in claim 1, in which fluid to be cooled enters the space between a pair of discs and flows in opposite axial directions through the discs to an outer end face of each disc whilst the fluid to be heated flows from a space at the outer end face of each disc in opposite axial directions through each disc to enter the space between the discs.

References Cited by the Examiner

UNITED STATES PATENTS 2,680,008　6/54　Karlsson _____ 165—8

FOREIGN PATENTS 570,543　2/59　Belgium.
957,953　8/49　France.

CHARLES SUKALO, *Primary Examiner.*